United States Patent
Price et al.

(10) Patent No.: US 7,716,376 B1
(45) Date of Patent: May 11, 2010

(54) SYNCHRONIZED VIDEO SESSION WITH INTEGRATED PARTICIPANT GENERATED COMMENTARY

(75) Inventors: Roy F. Price, Seattle, WA (US); Ethan Z. Evans, Snoqualmie, WA (US); Ameesh Paleja, Lynwood, WA (US)

(73) Assignee: Amazon Technologies, Inc., Seattle, WA (US)

(*) Notice: Subject to any disclaimer, the term of this patent is extended or adjusted under 35 U.S.C. 154(b) by 872 days.

(21) Appl. No.: 11/277,673

(22) Filed: Mar. 28, 2006

(51) Int. Cl.
G06F 15/16 (2006.01)
G06F 3/00 (2006.01)
G06F 3/048 (2006.01)

(52) U.S. Cl. .................. 709/248; 715/751; 715/781
(58) Field of Classification Search .................. 709/248
See application file for complete search history.

(56) References Cited

U.S. PATENT DOCUMENTS

| | | | | |
|---|---|---|---|---|
| 5,475,835 A | * | 12/1995 | Hickey | 707/104.1 |
| 5,694,163 A | | 12/1997 | Harrison | |
| 5,808,662 A | * | 9/1998 | Kinney et al. | 348/14.1 |
| 5,987,509 A | * | 11/1999 | Portuesi | 725/113 |
| 6,154,600 A | * | 11/2000 | Newman et al. | 386/4 |
| 2002/0120925 A1 | | 8/2002 | Logan | |
| 2003/0098869 A1 | * | 5/2003 | Arnold et al. | 345/589 |
| 2003/0212996 A1 | * | 11/2003 | Wolzien | 725/60 |
| 2004/0103444 A1 | * | 5/2004 | Weinberg et al. | 725/132 |
| 2005/0091694 A1 | | 4/2005 | Rambo | |

OTHER PUBLICATIONS

"VH1.com Shows: Pop-Up Video : Main Page," http://www.vh1.com/shows/dyn/pop_up_video/series.jhtml, retrieved from Internet on Sep. 8, 2005.
"Watch Free, Live Internet Television—The ManiaTV! Network," http://www.maniatv.com, retrieved from Internet on Sep. 8, 2005.

* cited by examiner

*Primary Examiner*—Firmin Backer
*Assistant Examiner*—James Edwards
(74) *Attorney, Agent, or Firm*—Lee & Hayes, PLLC (57) ABSTRACT

Systems and methods enable users to exchange content, such as chat text, with other users that are consuming video media. In one implementation, several users collectively group together to form a video session. The users in the video session each consume the same video media, and the video media is played on individual user computer devices in a synchronized manner. The users send chat text or other content to one another over a network using a computer user interface. The chat text or other content is superimposed over or otherwise merged with the synchronized video running on the individual user computer devices.

18 Claims, 9 Drawing Sheets

SYNCHRONIZED VIDEO SESSION WITH INTEGRATED PARTICIPANT GENERATED COMMENTARY

BACKGROUND

Broadcast television reaches viewers across the globe. The signals belonging to broadcast television normally include video and audio signals that are selected by an entity delivering the signals. Recipients of broadcast signals cannot actively interact with the received signals; the media is generally passive in character and substance. Accordingly, broadcast television is often treated as background noise if there is nothing of interest currently broadcast. Alternately, a broadcast television recipient may simply turn off a television if the received broadcast programs are of no interest. Video media on DVDs and other replayable technology generally has the same passive character and substance as broadcast television.

At least one existing technology attempts to enrich video media. In particular, television broadcasters may advertise websites that television viewers can access to retrieve information related to television shows, advertisements, additional content, etc. Frequently, links to these websites are included as part of the broadcast signals. This type of video media enrichment normally necessitates the use of a separate device (e.g., computer) to gain access to the websites. This practice can result in information overload, or the loss of interest in a television show that includes the Website references.

SUMMARY

Features that enhance a user's experience during consumption of video media are described. Such features enable a user to exchange content, such as text, with other users that are consuming the video media. In one implementation, several users collectively group together to form a video session. The users in the video session each consume the same video media, and the video media is played on individual user computer devices in a synchronized manner. In one implementation, the users send text to one another over a network using a user interface. In another implementation, users send graphics, video or other audio data to one another over a network. The text, graphics, etc., may be superimposed over the synchronized video running on the individual user devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to systems and methods intended to enhance user enjoyment of video media. In one implementation, video media is enhanced by allowing a group of users to interact as they view the video media. Interactions between users in the group may be over a network, such as the Internet. Various content, such as user comments, may be shared between users in the group. Other shared content can include graphics (e.g., images, photos, drawings, etc.), audio or video data.

A central authority, such as a session host or Website, may be used synchronize video media played on users' devices (e.g., computers). The central authority may also include video media that may be downloaded by the users to their respective devices. Similar or the same video media accessible by the users' devices are synchronized by the central authority to enable a user to interact with other users. Synchronization of video media playing on the users' devices generally ensures that interactions between the users are contextually relevant.

The systems and methods intended to enhance video media may be implemented a number of ways. One example implementation is provided below with reference to FIGS. 1-9, as described below.

System Environment

Figure 1:
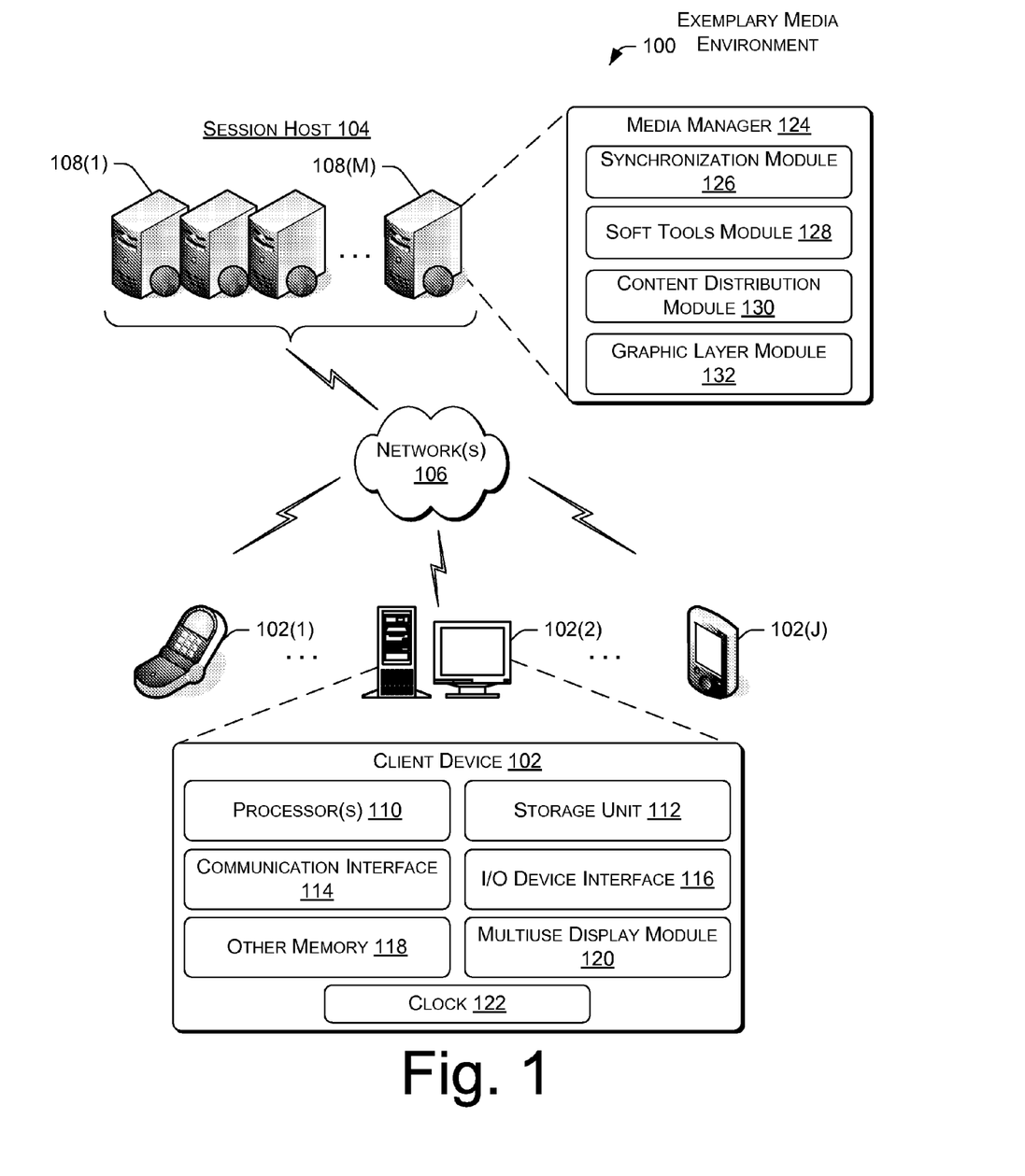
FIG. 1 illustrates an exemplary media environment in which a plurality of users, using user computer devices, may interact with each other as they consume video media. Interactions between the various uses may be in the form of text that is input and communicated over a network using a user computer device.

FIG. 1 illustrates an exemplary media environment 100 in which a plurality of users, using user computing devices 102, may interact with each other as they consume similar or the same video media. In the environment 100, many user computing devices 102(1), . . . , 102(J) can access a session host 104 via a network 106. The network 106 is representative of many different types of networks, such as cable networks, local area networks, wide area networks, the Internet, wireless networks, or a combination of such networks.

The session host 104 is hosted on one or more servers 108(1), . . . , 108(M), perhaps arranged as a server farm. Other server architectures may also be used to host the session host 104. The session host 104 is capable of handling requests from many users and serving, in response, various information and data to the user computing devices 102. The session host 104 is representative of essentially any site supporting user interaction, including online ecommerce entities offering downloadable media, and so forth.

The user computing devices 102 (also referred to as "client computers," "client devices," or simply "clients") are illustrated as a wireless phone, a personal computer, and a portable digital assistant (PDA), but may also be implemented as other devices, such as a television set-top box, a game console, a laptop computer, and so forth. Each user computing device 102 is equipped with one or more processors 110 and a storage unit 112 to store applications and data. The computing devices 102 also include a communication interface 114 that enables communication with the network 106 and other devices that may be connected to the network 106. The devices 102 are outfitted with an input/output (I/O) interface 116 that enables connection with various conventional computing peripherals. Additional memory 118 and a multiuse display module 120 are also employed by the user computing devices 102. The client device 102 may also have a clock 122, which may be hardware or software realized. Several components of the devices 102 will be discussed in further detail later in this description.

The user computer devices 102 may be located in different geographical locations across the globe. For example, a user may be using a computer device 102 in one country; and another user may be using a computer device in a second country. Regardless of the location of a given computer device 102, the network 106 enables communication with the session host 104, as well as other devices that may be in communication with the network 106.

When users direct the computing devices 102 to request content from the session host 104, the devices 102 may send uniform resource identifier (URI) requests to the servers 108. Upon receiving a URI request, the servers 108 return a Webpage back to a requesting client computer 102. The user computing device 102 invokes a browser to render the Webpage, allowing a user to interact with the Webpage. A returned Webpage may include links that enable a requesting client computer to download content stored and offered by the session host 104. Other user interfaces, such as dedicated applications implemented using software instructions and stored locally on a device 102, may be used to interact with the session host 104.

The session host 104 is configured to support providing downloadable video media for use on the user computing devices 102. The session host 104 also has facilities that support synchronizing playback of video media stored in the computing devices 102.

A media manager 124 runs on one or more of the servers 108 to manage providing the downloadable video media and performing the synchronization function. The media manager 124 employs a synchronization module 126 to synchronize video media played on the client devices 102.

A soft tools module 128 includes downloadable computer-executable instructions that may be retrieved by the client devices 102. When executed on a client device 102, the instructions may impart to the client devices 102 some of the synchronizing features of the synchronization module 126. The soft tools module 128 may also include downloadable computer-executable instructions that define a user interface that can be used by the computing devices 102 to play video media. Such a user interface may also allow users of the computing devices 102 to enter and communicate content to other computing devices 102 connected to the session host 104. Use of the soft tools module 128 on a client computing device is discussed later in this document.

The media manager 124 enables content exchange between client computers 102 that are playing video media in a synchronized fashion. Such video media playing in a synchronized fashion is often referred to as synchronized video media in this disclosure. Through the use of a user interface, users of the client computers 102 are able to create content that can be sent to the session host 104. The media manager 124 is equipped with a content distribution module 130 that communicates the received content to other users' computing devices 102 that are playing the synchronized video media. A graphic layer module 132 of the media manager 124 may be used to format the received content, so that it may be properly combined with the synchronized video media playing on the other users' computing devices 102.

In one exemplary implementation, each user in a group of users utilizes a distinct client computing device 102 to interface with the session host 104. Successful communication allows access to the media manager 124. Using an appropriate user interface resident on each computing device 102, or served by the session host 104, the users request an instantiation of a joint video session. In the example, the requested video session is to include a recent broadcast television show. Other video media may be included in the video session as well. For example, a video session can include one or more of movies, educational video media, business events, concerts, and the like. In general, a video session may include any video content, where video is broadly defined as including any content, e.g., text, images, etc., that may be displayed on a display device or display surface.

Through the communication session established with each of the computing devices 102, the media manager 124 verifies that the recent broadcast television show is locally accessible by the devices 102. This may be accomplished by way of a search of the storage units 112 and other memory 118 employed by the devices 102. If the device 102 employs removable medium and/or a removable device, for example a optical disc usable in an optical drive, (e.g., DVD drive), an external/internal hard drive(s), and/or a thumb drive, such technology may be searched as well to determine if the recent broadcast television show is locally accessible to the devices 102. If the recent broadcast television show is not locally accessible by any one of the devices 102, the media manager 124 may offer the show for download, or instruct the devices 102 to insert a DVD, or the like, that includes a recorded copy of the recent broadcast show.

Synchronization of the video locally accessible by the computing devices 102 is now possible. To achieve proper synchronization, the media manager 124 may request and gain control of the computing devices 102 participating in the joint video session. The synchronization module 126 facilitates the process of establishing control of the computing devices 102. In one implementation, the acquired control is voluntary. In other words, a user may instruct a respective computing device 102 to terminate the control obtained by the synchronization module 126.

A complete copy of the recent broadcast television show is not required to be locally accessible by the computing devices 102. To synchronize properly, only the first few video segments or frames (e.g., a few minutes) of the recent broadcast television show may be locally accessible by the computing devices 102 that are part of the video session. Therefore, if a participating computing device 102 does not have local access to the recent broadcast television, the computing device 102 may request and begin to download the show. Before the download is complete, the media manager 124 may use the synchronization module 126 to synchronize the recent broadcast television show locally accessible by each participating computer device 102.

After the synchronization module 126 has control of or has otherwise enabled synchronization of the playback of the media by the computing devices 102 participating in the video session, initiation of synchronized video may commence. Simultaneously, the synchronization module 126 starts the recent broadcast television show locally accessible by each computing device 102. The client devices 102 are now playing the recent broadcast television show simultaneously. The synchronization module 126 may send out periodic re-syncing signals to the client devices 102 to ensure the recent broadcast television show remains synchronized on each of the client devices 102.

Video synchronized on the client devices 102 provides an environment in which users of the respective client devices 102 may exchange commentary and other content while consuming the synchronized video and/or other media. To that end, the media manager 124, aided by the content distribution module 130 and the graphic layer module 132, is designed to distribute content produced by users of the client devices 102 that are participating in the video session.

A user of one of the participating client devices 102 uses a user interface to input commentary. Upon instruction to do so, the client device 102 sends the commentary to the session host 104 via the network 106. The commentary is formatted into a graphic layer by the graphic layer module 132. More specifically, the commentary may be integrated with a substantially transparent layer that can be superimposed over video media. The graphic layer is communicated to the other computing devices 102 participating in the video session. As an alternative, the module 132 may package the commentary with instructions that may be used by a participating client device 102 to render a graphic layer that includes integrated commentary. Such instructions may include translucency particulars of the graphic layer, positioning of the commentary in the layer, color attributes of the commentary, and translucency particulars of a text bubble. The multiuse display module 120 may be responsible for handling such a package delivered by media manager 124.

The graphic layer is superimposed over the video media playing on the computing devices 102 that are participating in the video session. A user interface of the computing devices 102, either resident at the devices 102 or supplied by the session host 104, performs the superimposing process. The graphic layer remains superimposed over the video media for a period of time. For example, if the graphic layer includes chat content contained in a chat bubble, the contents of the chat bubble or associated control instructions may determine how long the graphic layer remains superimposed over the video media. Longer chat content will remain superimposed over the video media for a greater amount of time than shorter chat content. In one implementation, graphic layers that have chat content in excess of ten (10) words remain superimposed over video media for at least fifteen (15) seconds; graphic layers that have chat content with 10 or less words remain superimposed over video media for at least 10 seconds, but not greater than 15 seconds.

Media Manager Implementation

Figure 2:
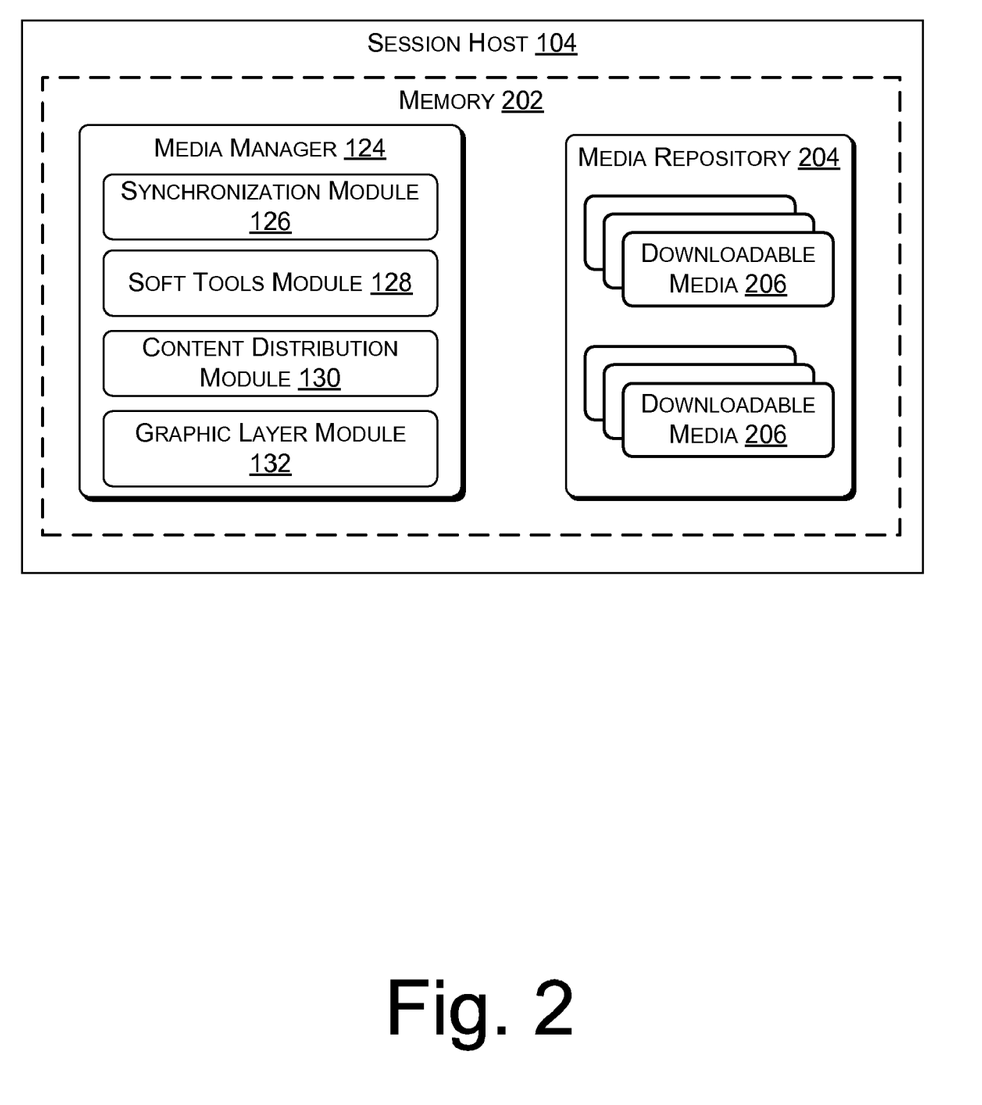
FIG. 2 is a block diagram illustrating modules and components employed by a server. The included modules and components may be used to manage a synchronized video session on various user computing devices.

FIG. 2 illustrates an example implementation of the media manager 124 that is implemented on one or more of the servers 108(1)-108(M). The servers 108 have processing capabilities and memory suitable to store and execute computer-executable instructions. In this example, the media manager 124 is implemented as software or computer-executable instructions stored in a memory 202 of the server(s) 108 and executed by one or more processors of the servers 108. The memory 202 may be implemented as non-removable persistent storage of the servers 108, although other suitable computer storage media may also be used to store the media manager 124. An example of a computer system is provided below with reference to FIG. 3.

The following description provides additional details related to the operational characteristics of the server 108 and the media manager 124.

There are various methods that the synchronization module 126 may use to synchronize video media playback on a client device 102 that may be collaboratively participating in a video session. In one implementation, the module 126 references a system clock (e.g., the clock 122) on each of the participating client devices 102. Here, the synchronization module 126 may need to consider the different time-zone locations of the participating client devices 102. Additionally, if some or all of the system clocks referenced differ by a number of seconds or even minutes, the module 126 considers/reconciles these discrepancies as well. The synchronization module 126 then issues a video playback start time to each of the client devices 102 participating in the video session based on the foregoing considerations. A user interface, either resident on the client devices 102 or provided by the host 104, initiates playback of the video media when the start time is reached. In another implementation, the synchronization module 126 sends a "play" command to each of the client devices 102 participating in the video session. The communication of such a command may occur after verifying that each of the client devices 102 includes the video media for playback in the video session.

The synchronization module 126 is also capable of ensuring that playback of synchronized video locally accessible by the client devices 102 remains substantially synchronized over the duration of a given video session. To achieve this, the module 126 may issue periodic re-sync signals or commands to each of the client devices 102 participating in a video session. Such periodic re-sync commands may identify a video frame or timing intrinsic to the synchronized video. Each of the participating client devices 102 uses these periodic re-sync commands, if necessary, to fast-forward or rewind the synchronized video.

The soft tools module 128 includes downloadable computer-executable instructions that implement a user interface that can display video media on one or more of the client devices 102. An exemplary user interface is illustrated in FIGS. 4-7. The user interface also allows users to enter and send content/commentary (e.g., chat) to other user computer devices 102 participating in a video session. The instructions that implement the user interface may also impart functionality that allows the computer devices 102 to operate in a peer-to-peer networked arrangement. A computer device 102 equipped with a user interface imparted with peer-to-peer functionality is capable of hosting a video session that client devices 102 can join. A client device 102 including such a user interface would perform the synchronizing of the video media played on each of the participating client devices 102. Moreover, content and/or commentary exchanged between the client devices 102 participating in the video session is funneled through the hosting client device 102. Thus, such a hosting client device 102 is capable of performing substantially all of the tasks discussed in connection with the host 104, and in particular, the media manager 124.

The content distribution module 130 works in conjunction with the graphic layer module 132 to deliver content, received from a client device 102, to other client devices 102 that are participating in a joint video session. A user may enter content using a user interface invoked on a client device 102. This content may be text chat data, audio data, video data, or the like. In one implementation, a keyboard or similar input device may be used to enter content (e.g., text chat data). In another implementation, a client device 102 may have speech-to-text technology that may be used to enter content, or a separate instant messaging interface may also be used to enter text chat data for distribution to other client devices 102. Upon user instruction to do so, the device 102 sends the entered data to the host 104.

The content distribution module 130 evaluates the content data received from the client device 102. If the content is audio or video content, the content distribution module 130 passes the content directly to the other client devices 102 participating in the video session. It is assumed that client devices 102 described herein have conventional technology for replaying audio and video. If the content is text chat data, the content distribution module 130 passes the data to the graphic layer module 132.

The graphic layer module 132 formats the text chat data as an integrated part of a video layer that may be superimposed over video media. In other words, a video layer generated by the graphic layer module 132 may be merged and combined with synchronized video media associated with a video session that includes a number of participating client devices 102.

In one implementation, the text chat data is integrated with a substantially transparent video layer. The substantially transparent video layer may, for example, include a speech bubble and/or idea bubble. The graphic layer module 132 inserts the text chat data in the speech bubble and/or idea bubble. In this manner, the bubbles may be translucent, or opaque elements positioned within an otherwise substantially transparent video layer. The inserted text chat data is appropriately colored to ensure readability when combined with the bubbles. Moreover, the bubbles may be spatially positioned in the substantially transparent video layer to avoid interfering with objects/people appearing in the video media the video layer is superimposed over. Layers having integrated bubbles are sent to client devices 102 participating in a video session. The received layers may be superimposed over video media.

The host 104 includes a media repository 204. Downloadable media 206 is stored in the media repository 204 and is available for download by the client devices 102. Example downloadable media 206 may include movies, television shows, sporting events, concerts, and other similar video media. The downloadable media 206 may be downloaded without charge, or may be premium content that requires a user of computing device 102 to submit payment information before the video media is downloaded. Any conventional online billing arrangement or method may be used to complete a purchase transaction for such premium video media.

Exemplary Computing Device

Figure 3:
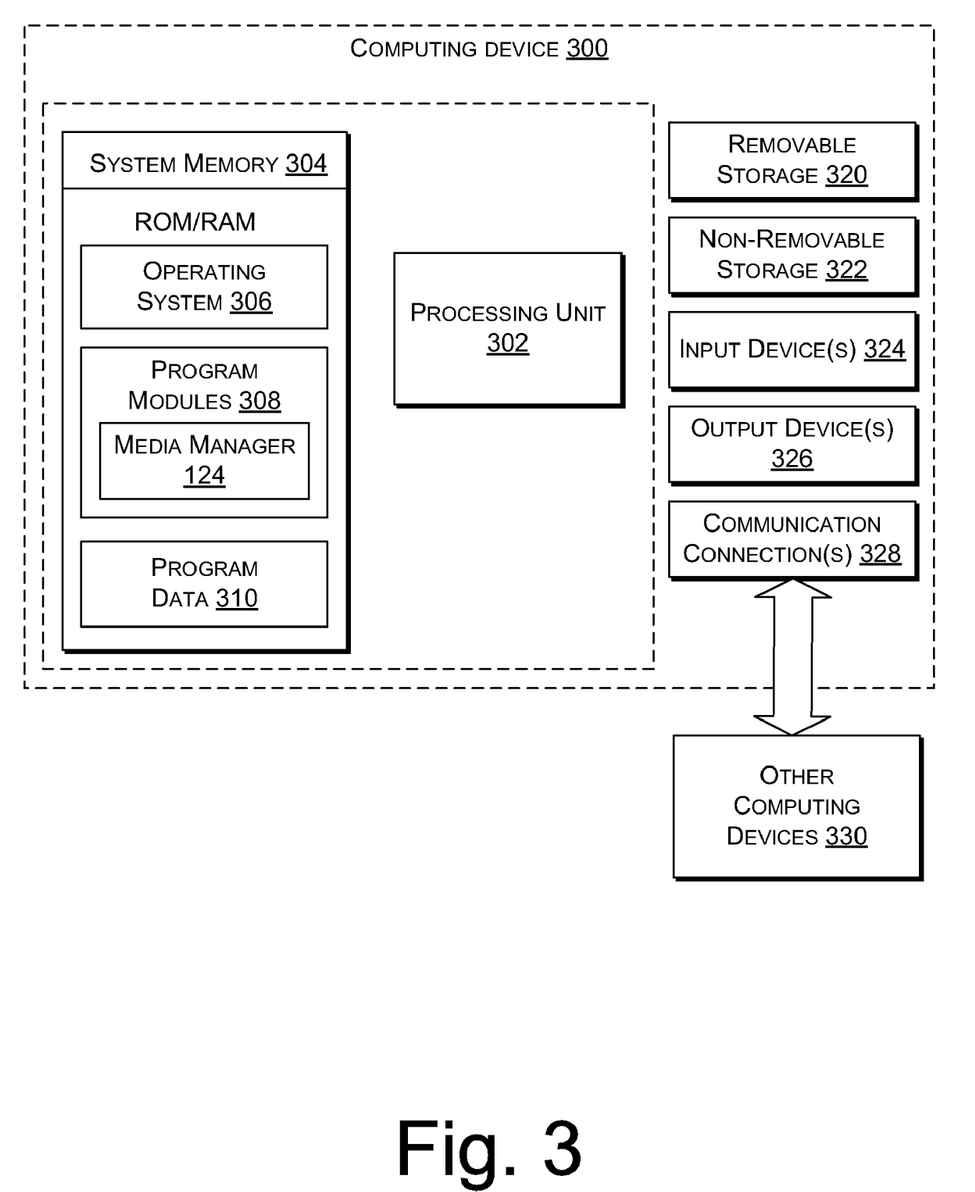
FIG. 3 is a block diagram illustrating functional components in a computing device that might be used to implement the clients or servers shown in FIG. 1.

FIG. 3 is an illustrative computing device that may be used to implement the servers 108(1)-108(M) and client computers 102(1)-102(J). In a very basic configuration, the computing device 300 includes at least one processing unit 302 and system memory 304. Depending on the exact configuration and type of computing device 300, the system memory 304 may be volatile (such as RAM), non-volatile (such as ROM, flash memory, etc.) or some combination of the two. The system memory 304 typically includes an operating system 306, one or more program modules 308, and may include program data 310. For the present implementations, the program modules 308 may include the media manager 124. As an alternative, the media manager 124 may be implemented as part of the operating system 306, or it may be installed on the computing device and stored in other memory (e.g., non-removable storage 322) separate from the system memory 306.

The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by removable storage 320 and non-removable storage 322. Computer storage media may include volatile and non-volatile, removable and non-removable media implemented in any method or technology for storage of information, such as computer readable instructions, data structures, program modules, or other data. The system memory 306, removable storage 320 and non-removable storage 322 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of the device 300. Computing device 300 may also have input device(s) 324 such as keyboard, mouse, pen, voice input device, touch input device, etc. Output device(s) 326 such as a display, speakers, printer, etc. may also be included. These devices are well know in the art and need not be discussed at length.

The computing device 300 may also contain a communication connection 328 that allows the device to communicate with other computing devices 330, such as over a network like network 106 of FIG. 1. Communication connection(s) 328 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

User Interface

FIGS. 4-7 illustrate exemplary user interfaces displayable on a display device interfaced with a client computer 102. Such a display device may be an appropriate computer display (e.g., an LCD or CRT display), a television, or the like. The user interfaces may be realized by computer-executable instructions stored in a memory 202 of the server(s) 108 and executed by one or more processors of the servers 108. Realized user interfaces may be communicated to client computers 102 over the network 106 in the form of Web pages or other network deliverable graphic formatted files. Alternatively, such computer-executable instructions may be stored in a storage unit 112 or other memory 118 of the client computer 102. The stored computer-executable instructions may be executed by the processor 110 and displayed on an appropriate display device interfaced with the client computer 102. Computer-executable instructions for realizing the user interfaces illustrated in FIGS. 4-7 may be downloaded from the media manager 124, and in particular, the soft tools module 128.

Figure 4:
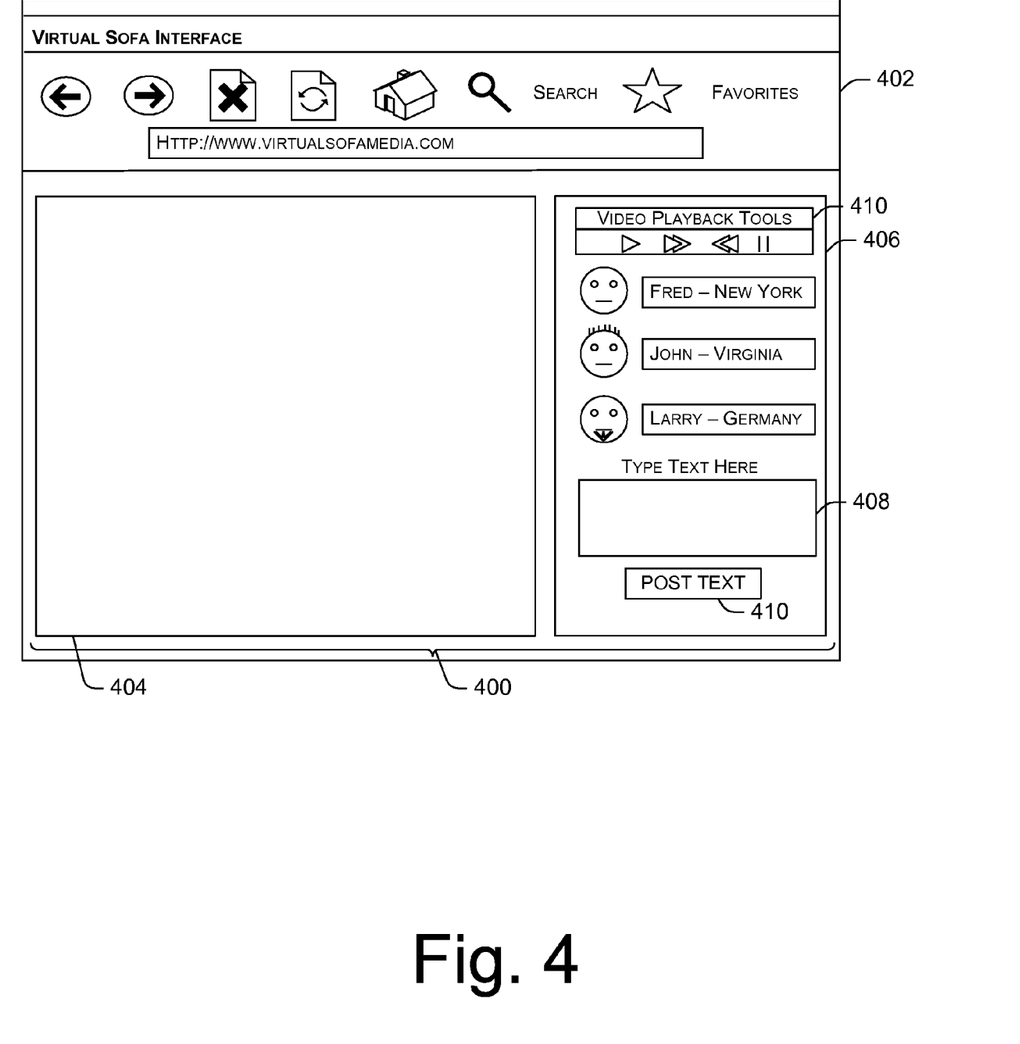
FIGS. 4-5 illustrate exemplary user interfaces displayable on a display device interfaced with a client computer. Exemplary client computers are illustrated in FIG. 1.

The exemplary user interface 400 illustrated in FIG. 4 is shown in a Web browser window 402. The user interface 400 includes a video media window section 404 and a user participant window section 406. The video media window section 404 may be used to display synchronized video media. The user participant window section 406 includes a text entry field 408 that can receive chat text data. Chat text data entered in the text entry filed 408, using an appropriate input device coupled to a client device 102, may be sent to other client devices 102 upon actuation of a button 410. For example, client devices 102 associated with a video session may receive the chat text data upon actuation of the button 410.

The user participant window section 406 shows three active users (i.e., Fred, John and Larry). These users represent participants in a video/media session that includes synchronized video being played on the participants' client devices 102. The uppermost participant in the window section 406, in this case Fred, represents the user interfacing with the user interface 400 shown in FIG. 4. The other listed participants, in this case John and Larry, are participants interfacing with their own respective user interface rendered using a client device 102.

The interface 400 also employs a video playback tools window 410. The video playback tools window 410 allows a user to control synchronized video playing in the video media window section 404. Use of the playback tools of the tools window 410 may affect the synchronized video playing on client devices 102 associated with a video session. Actuating one or more of the playback tools sends a relevant command to the synchronization module 126. The command is forwarded to the other client devices 102 associated with the video session, which also execute the command. Therefore, if one participating client device 102 "pauses" the synchronized video, the command is forwarded to the other devices 102 to ensure the video playing on those devices is paused as well. In an alternative implementation, when one of the participating client devices 102 pauses the synchronized video. The paused device 102 monitors the playback of the synchronized video on at least one of the other devices 102 and re-synchronizes video playback after the pause period ends.

The participating client device 102 that initiates use of one or more of the playback tools of the tools window 410 may also send the synchronization module 126 a video frame and/or a particular timing intrinsic to the synchronized video that indicate when the playback tool was actuated. The synchronization module 126 may forward this information with the command for affecting playback of the synchronized video. This video frame and/or timing information are used to maintain synchronized playback of the synchronized video.

Figure 5:
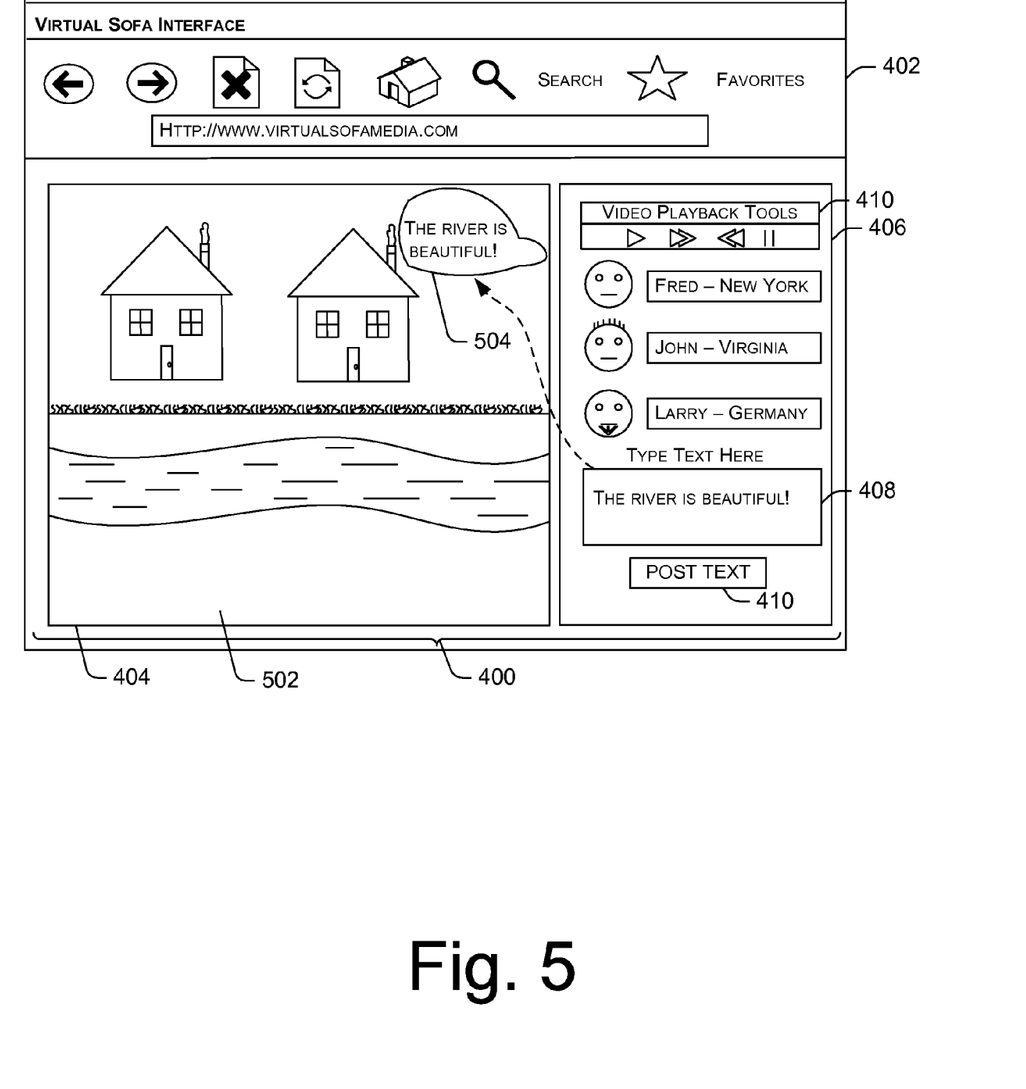

FIG. 5 illustrates the user interface 400 with synchronized video media 502. A chat bubble 504 is superimposed over the synchronized video media 502 that shows two homes along with a river. Here, Fred thinks the river is beautiful in this scene and wants to convey this to the other users. So, he types "The river is beautiful!" into the text entry field 408 and then posts the text by actuating the button 410.

The chat bubble 504 is part of a substantially transparent video layer generated when the user Fred entered the displayed chat text into the text entry field 408 and the button 410 was actuated. The substantially transparent video layer including the chat bubble 504 is also superimposed over synchronized media 502 available to John and Larry via their respective client devices 102. As was discussed previously, the media manager 124 may be responsible for distributing the video layer that incorporates the chat bubble 504. In another implementation, a client computer 102 acting as host computer and possessing similar or equivalent functionality to the media manager 124 may also distribute the video layer.

Figure 6:
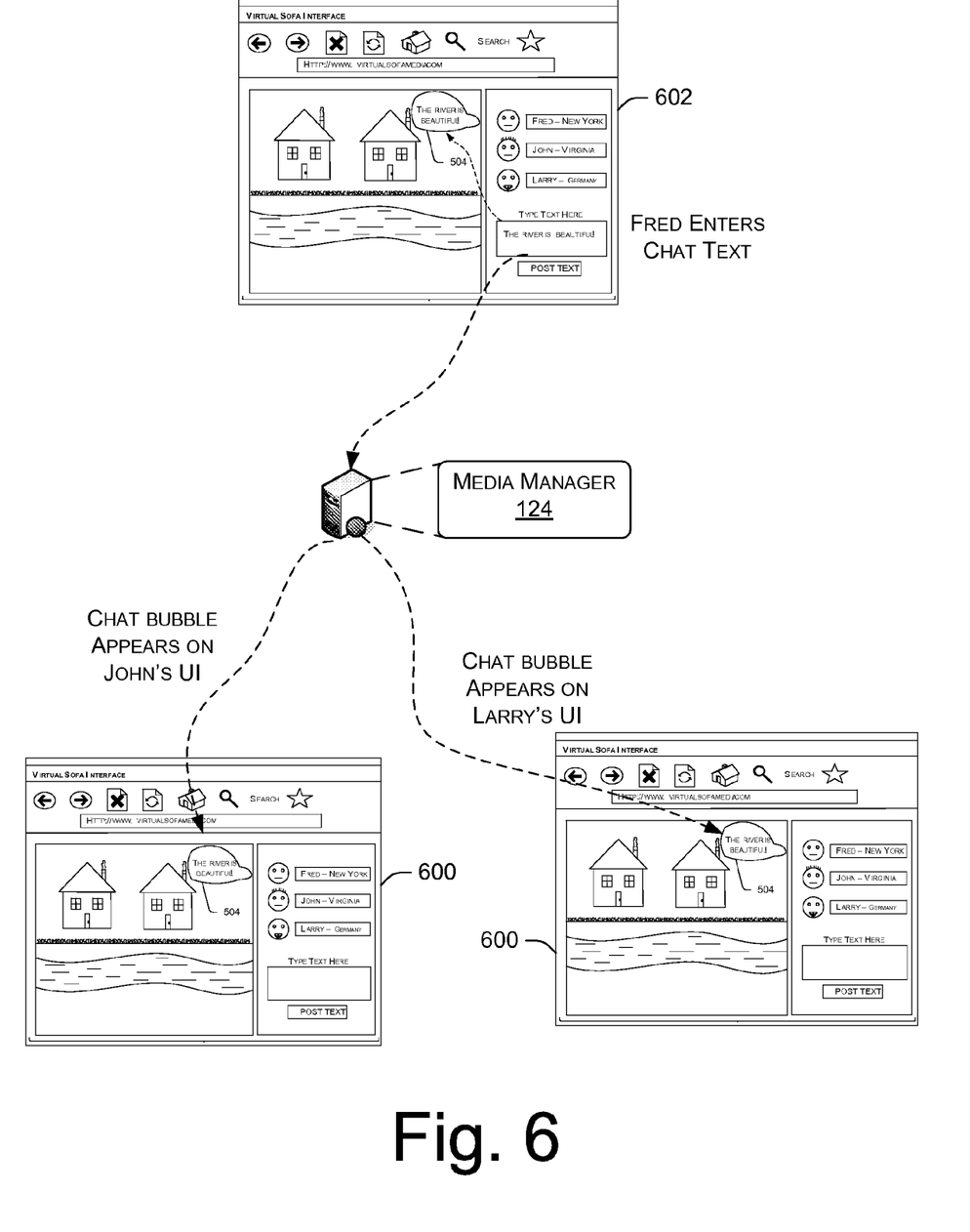
FIG. 6 illustrates an exemplary example of various users that have received commentary input by a user while viewing video media played in a synchronized fashion.

FIG. 6 illustrates video layers 600, which incorporate the chat bubble 504, distributed by the media manager 124 to John and Larry. The video layers 600 may be displayed using a Web browser employed by respective client devices 102 belonging to John and Larry. The users illustrated in FIG. 6 may be in communication through a server, or the users may be communicating in a peer-to-peer arrangement. A video layer 602, on Fred's client device 102, also includes the chat bubble 504. Note that the chat text entered by Fred need not pass through the media manager 124; Fred's client device 102 handles the rending and display of the video layer 602.

Figure 7:
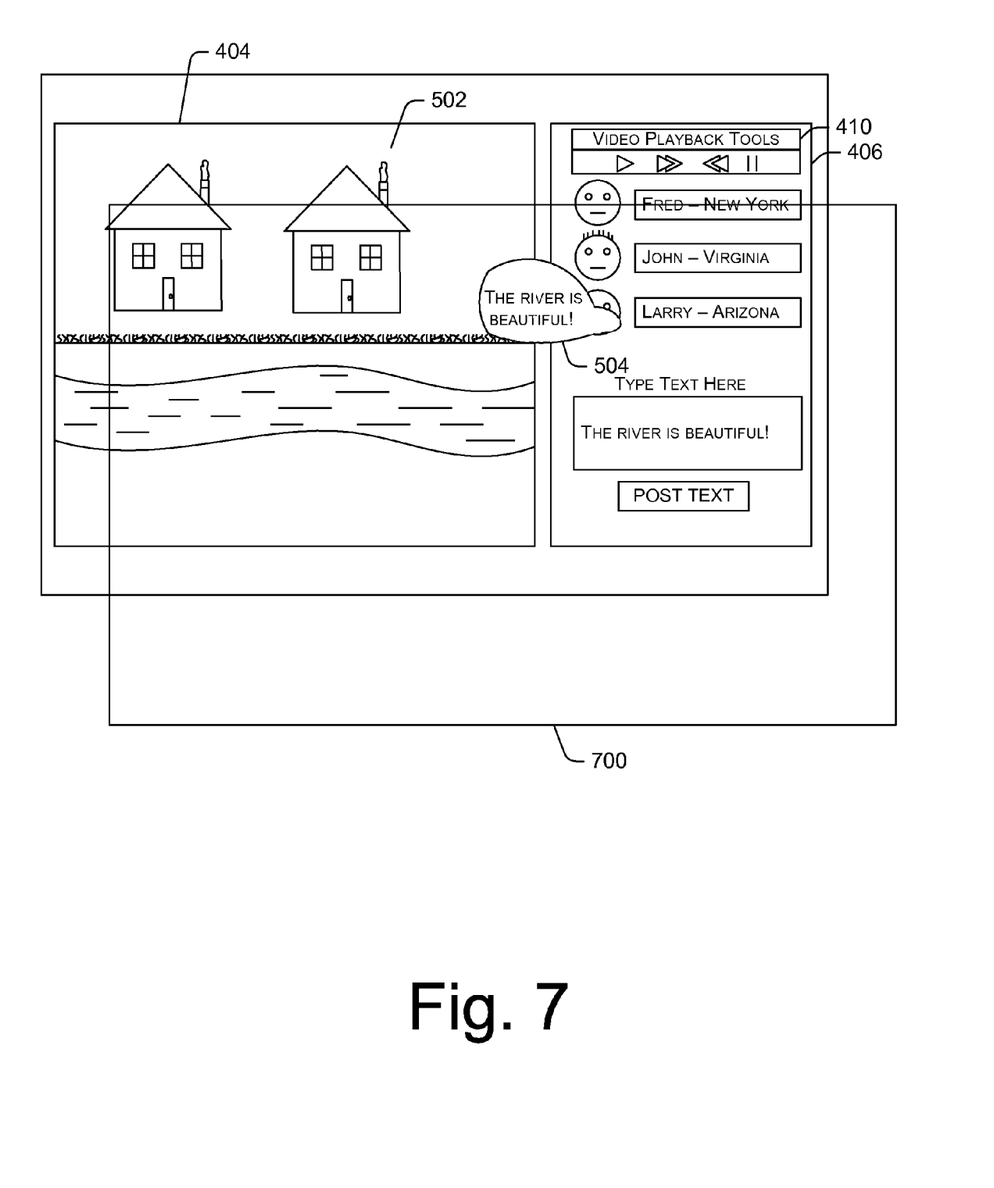
FIG. 7 illustrates an exemplary video layer that may be superimposed over synchronized video media.

FIG. 7 illustrates an exemplary video layer 700 that may be superimposed over the synchronized video media 502. The video layer 700 is show as comprising the chat bubble 504. The video layer 700 is translucent, yet the chat bubble 504 is opaque. Therefore, the video layer 700 will not conceal the substance of the synchronized video media 502 when the layer 700 is superimposed over the media 502. The video layer 700 may be many different sizes and shapes; the translucency may vary; and the chat bubble 504 may have a different format, size, color and shape.

Operation

Figure 8:
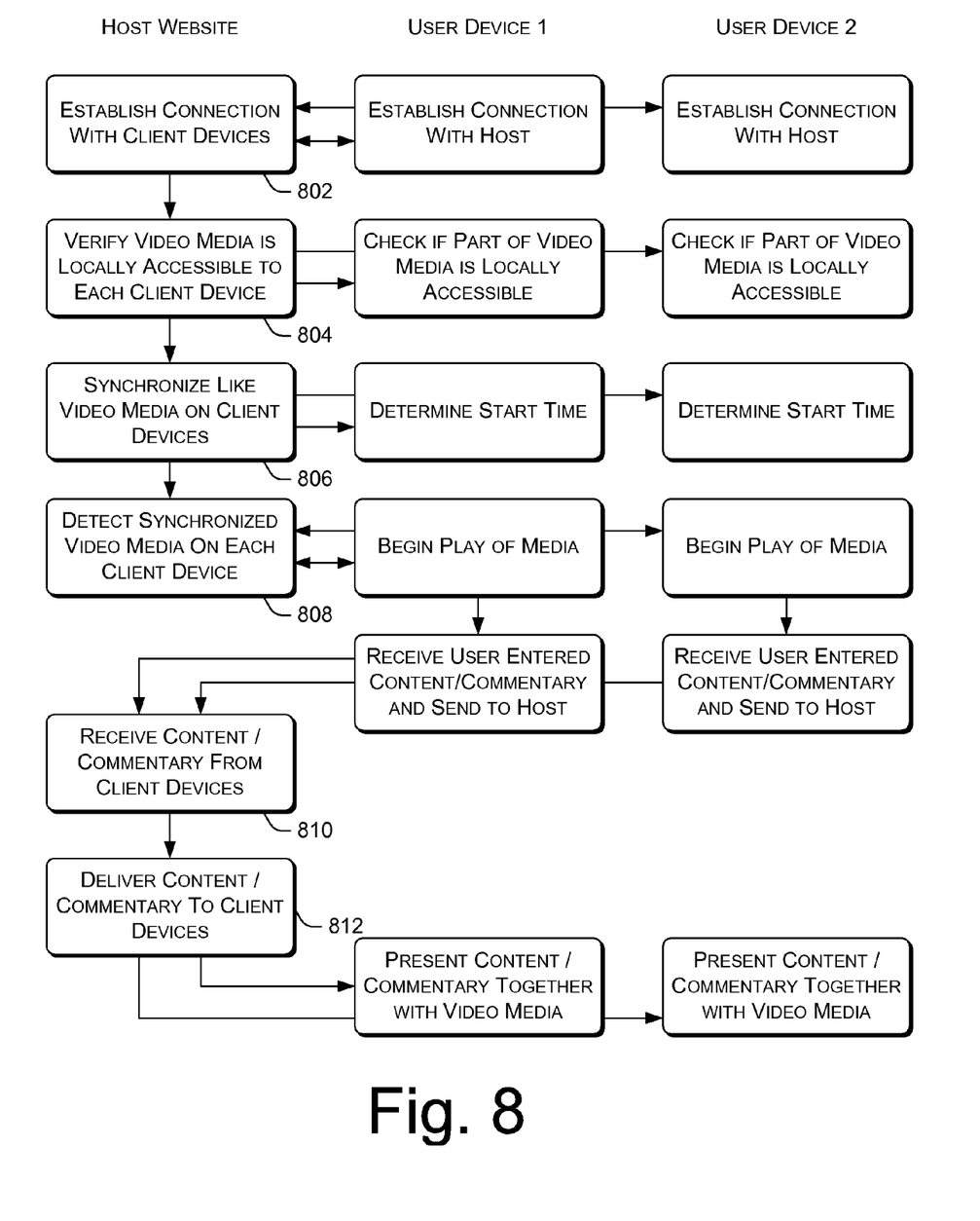
FIG. 8 is a flow diagram of a process for establishing and hosting a video session common among a plurality of computing devices. A hosting entity, such as a website, hosts the video session common among the plurality of computing devices.
Figure 9:
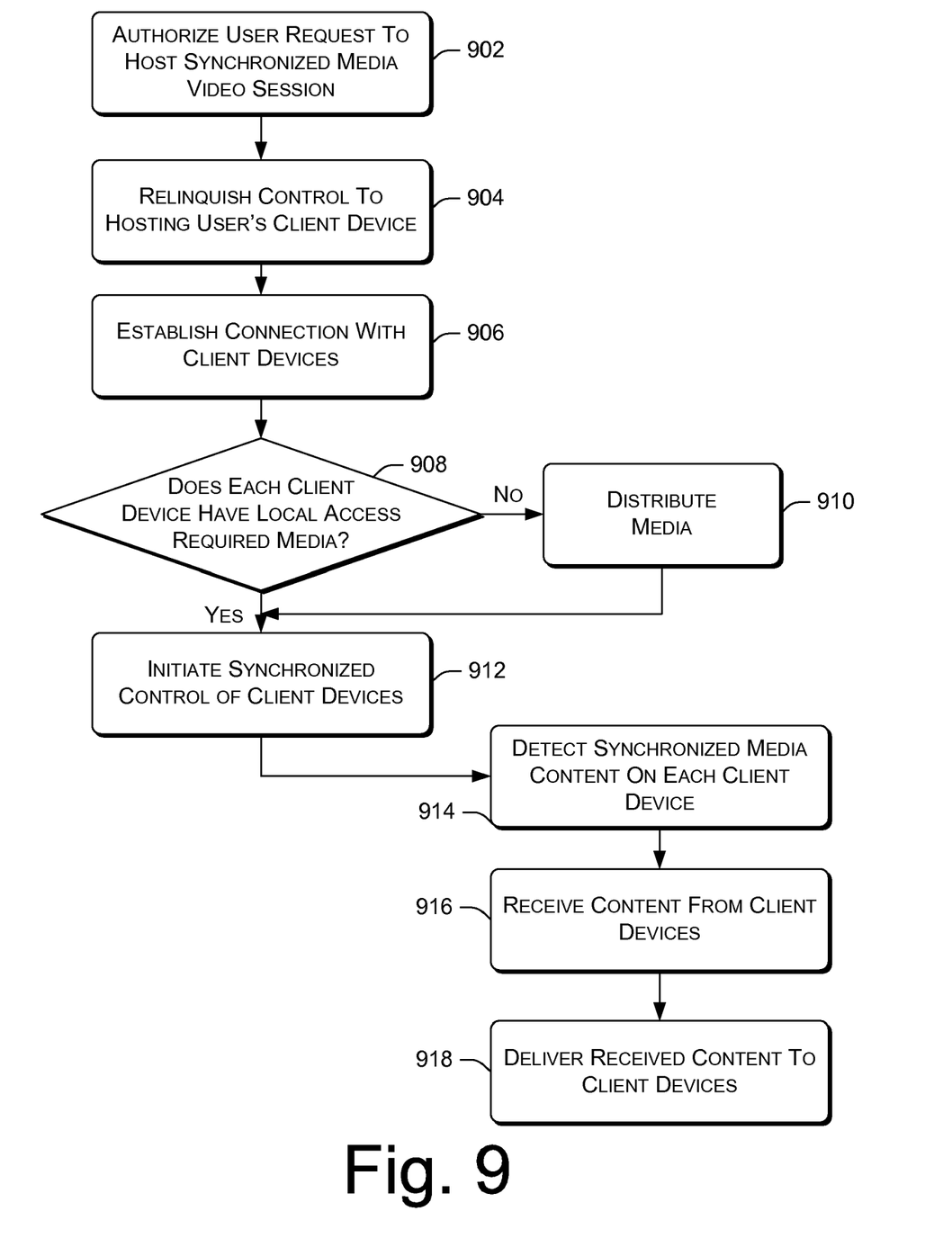
FIG. 9 is a flow diagram of a process for establishing and hosting a video session common among a plurality of computing devices. A client device participating in the video session may host the video session common among the plurality of computing devices.

FIGS. 8-9 illustrate example processes for establishing a video session common among client devices. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes may be described with reference to the exemplary media environment 100 of FIG. 1, and the media manager 124 described with reference to FIGS. 1 and 2. In particular, many acts described below may be implemented and performed by the media manager 124, and its components and modules, illustrated in FIGS. 1 and 2. If specific reference is not made to the environment 100 and the media manager 124, it is to be assumed that a similar arrangement(s) having the features and capabilities described herein is executing the example processes illustrated in FIGS. 8-9.

Users referred to in the following, as well as the foregoing, are generally interfacing with a client computer, or similar computing device, of the type described herein with reference to FIGS. 1-3. User interfaces referred to in the following, as well as the foregoing, are generally realized using a client computer of the type described herein with reference to FIGS. 1-3.

FIG. 8 shows a general process for establishing and hosting a video session common among a plurality of computing devices. A session host, such as the session host 104 illustrated in FIG. 1, will act as a central authority or master for client devices requesting permission to participate as part of a video session. For clarity, interactions that may occur with two client devices (device 1 and 2) are shown in the figure. These client devices may be user computing devices 102.

At block 802, the session host establishes a connection with client devices that wish to participate in a video session. Some client devices might already be in communication with the session host. If so, the processing of block 802 would not apply to the already connected client devices.

At block 804, the session host verifies that each of the participating client devices currently has local access to the video media that will be played, in a synchronized manner, on each of the client devices. Storage and memory of the client devices may be searched to determine the existence of the video media. Removable medium and/or a removable device, for example an optical disc usable in an optical drive, (e.g., DVD drive), an external/internal hard drive(s), and/or a thumb drive, may be searched as well. Other ways of determining the existence of the video media may be used as well. If one or more of the participating client devices does not have the required video media, the video media may be offered to those devices via download.

At block 806, the video media locally accessible by each of the participating client devices is synchronized. In one implementation, the media manager 124 observes and reconciles time clocks at each of the participating client devices. This may include taking into consideration the various time-zones of the participating client devices and/or the time variances of the clocks. Then, based on the foregoing considerations, the media manager 124 issues a video media playback start time to each of the participating client devices. When that time occurs, the participating client devices individually start playback of the video media. In another implementation, the media manager 124 may issue a play command to each of the participating client devices, thereby instructing the devices to start playback of the video media. The media manager 124 may periodically issue re-sync commands to the participating client device to ensure that playback of the video media remains synchronized.

At block 808, the media manager 124 solicits a response from each of the participating client devices confirming playback of the video media. Here, the media manager 124 may poll the participating client devices and request a confirmation message that the playback has commenced. Alternatively, the media manager 124 may make an inquiry of each participating client device to see if playback of the video media is currently active. Once playback is confirmed, at block 810, the media manager 124 is ready to receive content/commentary from the participating client devices. Such received content/commentary may include chat text data, audio and video media, among other types of content.

At block 812, the media manager 124 delivers received content/commentary to the participating client devices. The client device that sent the content/commentary does not receive the delivery. In the case of audio and/or video media received by the media manager 124, such media may be passed to the participating client devices without undergoing additional processing. However, chat text data may require formatting before it is delivered to the participating client devices. In particular, the chat text data may be integrated with a graphic layer that can be superimposed over the video media. The graphic layer is sent to the participating client devices and used together with the video media. Generally, the graphic layer is displayed over the video media for a predetermined timeframe and is then removed.

The instructions of blocks 810 and 812 are available during an entire video session that includes a plurality of client devices playing synchronized video media. The video media may include television shows, movies, educational content, recorded concerts, sporting events, and so forth.

FIG. 9 shows a general process for establishing and hosting a video session common to a plurality of computing devices. In this figure, a client device hosts the video session common to the plurality of computing devices, where the hosting device and the plurality of computing devices are networked together in a peer-to-peer format.

At block 902, the session host 104 authorizes a user's request to host a video session that includes synchronized video played on a plurality of client computing devices. Part of the authorization process may comprise verifying that the requesting user's client device includes an application that enables the device to synchronize video media on client devices participating in a video session. Such an application may be retrieved from the media manager 124 if necessary. In particular, as was discussed earlier, the soft tools module 128 includes downloadable computer-executable instructions that can act to enable a client device with the same or substantially the same functionality as the media manager 124.

At block 904, the session host 104 relinquishes certain aspects of the control of the media playback to the requesting user's client device. The session host 104 may still be in active communication with the client device, however. The active communication may be required if one or more of the client devices participating in the video session require the video media that will be played on the devices during the video session. At block 906, if a connection is not already in place, the hosting client device establishes a connection with the client devices participating in the video session. The connection between the computing devices is possible using the network 106.

At block 908, the hosting client device verifies that each of the participating client devices currently has local access to the video media that will be played, in a synchronized manner, on each of the client devices. Storage and memory of the client devices may be searched to determine the existence of the video media. Removable medium and/or a removable device, for example an optical disc usable in an optical drive, (e.g., DVD drive), an external/internal hard drive(s), and/or a thumb drive, may be searched as well. Other ways of determining the existence of the video media may be used as well. At block 910, if one or more of the participating client devices does not have the required video media, the video media may be offered to those devices via download. The session host 104 is responsible for distributing the required video media. The hosting client device may also distribute the required video media if authorized to do so.

At block 912, video media locally accessible by each of the participating client devices is synchronized. In one implementation, the hosting client device observes and reconciles time clocks at each of the participating client devices. This may include taking into consideration the various time-zones of the participating client devices and/or the time variances of the clocks. Then, based on the foregoing considerations, the hosting client device issues a video media playback start time to each of the participating client devices. When that time occurs, the participating client devices individually start playback of the video media. In another implementation, the hosting client device may issue a play command to each of the participating client devices instructing the devices to start playback of the video media.

At block 914, the hosting client device solicits a response from each of the participating client devices confirming playback of the video media. Here, the media manager 124 may poll the participating client devices and request a confirmation message that the playback has commenced. Alternatively, the media manager 124 may make an inquiry of each participating client device to see if playback of the video media is currently active. Once playback is confirmed, at block 916, the hosting client device is now ready to receive content from the participating client devices. Such received content may include chat text data, audio and video media, and the like.

At block 918, the hosting client device delivers received content to the participating client devices. The client device that sent the content does not receive the delivery. In the case of audio and video media received by the hosting client device, such media may be transferred to the participating client devices without undergoing additional processing. However, chat text data may require additional processing before it is transferred to the participating client devices. To that end, the chat text data may be integrated with a graphic layer that can be superimposed over the video media. The graphic layer is then sent to the participating client devices and used together with the video media. Generally, the graphic layer is displayed over the video media for a predetermined timeframe and is then removed.

The instructions of blocks 916 and 918 are available during an entire video session that includes a plurality of client devices playing synchronized video media. The video media may include television shows, movies, educational content, recorded concerts, sporting events, or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    verifying that a specified video media is locally accessible by at least two computing devices;
    synchronizing playback of the specified video media locally accessible by the at least two computing devices; and
    delivering content comprising text received from one of the at least two computing devices to another of the at least two computing devices, the content being presented as text within a chat bubble for a period of time in a translucent or substantially translucent graphic layer superimposed over the specified video media playing on the another of the at least two computing devices, wherein the period of time during which the text within the chat bubble is presented in the translucent or substantially translucent graphic layer over the specified video media is based at least in part on a number of words of the text within the chat bubble; and
    wherein the synchronizing comprises determining a clock time at each of the at least two computing devices and reconciling any differences between the clocks before issuing a video playback start time to each of the at least two computing devices.

2. A method as recited in claim 1, wherein the synchronizing includes issuing periodic re-sync commands to maintain the synchronized playback of the video media.

3. A method as recited in claim 1, wherein one of the at least two computing devices initiates playback of the video media from a disc contained in an optical disk drive locally accessible thereto, and another of the at least two computing devices initiates playback of the video media from persistent storage locally accessible thereto.

4. A media as recited in claim 1, wherein the delivered content includes audio media.

5. A method as recited in claim 1, wherein the delivered content includes video content.

6. A method as recited in claim 1, wherein the delivered content includes graphical content.

7. A method as recited in claim 1, wherein the text is processed by a text-to-speech converter prior to being delivered to the another of the at least two computing devices.

8. A method as recited in claim 1, further comprising distributing video media to at least one computing device, the distributed video media having the same video content as video media that is associated with a synchronized video media playback session.

9. One or more computer-readable storage media having computer-readable instructions therein that, when executed, direct one or more computing devices to perform acts comprising:
    verifying that a specified video media is locally accessible by at least two computing devices;
    synchronizing playback of the specified video media on each of the at least two computing devices; and
    delivering content comprising text received from one of the at least two computing devices to another of the at least two computing devices, the content being presented as text within a chat bubble for a period of time in a translucent or substantially translucent graphic layer superimposed over the specified video media playing on the another of the at least two computing devices, wherein the period of time during which the text within the chat bubble is presented in the translucent or substantially translucent graphic layer over the specified video media is based at least in part on a number of words of the text within the chat bubble; and
    wherein the synchronizing comprises synchronizing a clock at each of the at least two computing devices and issuing a video playback start time.

10. A media as recited in claim 9, wherein the computer-readable media is implemented in a client computing device.

11. A media as recited in claim 9, further comprising distributing video media to at least one computing device, the distributed video media having the same video content as video media that is associated with a synchronized video media playback session.

12. A media as recited in claim 9, wherein the content includes audio media.

13. A media as recited in claim 9, wherein the content includes video media.

14. A media as recited in claim 9, wherein the content includes graphical media.

15. A system, comprising:
    one or more processing units;
    memory;
    a synchronization module, stored in the memory and executable on the one or more processing units, to synchronize playback of video media among multiple computing devices during a synchronized playback session, wherein the video media is downloadable over a network to the computing devices;
    a content distribution module, stored in the memory and executable on the one or more processing units, to distribute content generated by participants in the synchronized playback session to computing devices playing the synchronized video media, the content comprising text for display within a chat bubble; and a graphic layer module to integrate the content comprising the text for display within the chat bubble with a translucent or substantially translucent graphic layer superimposed over the video media playing on the computing devices, wherein the translucent or substantially translucent graphic layer is superimposed over the video media on the computing devices for a period of time that is based at least in part on a number of words of the text within the chat bubble; and wherein the synchronization module is capable of periodically re-syncing playback of video media among multiple computing devices.

16. A system as recited in claim 15, wherein the text within the chat bubble comprises commentary on the video media received from a computing device participating in the synchronized playback session.

17. A system in communication with a plurality of computing devices, each of the plurality of computing devices playing synchronized video media on a display device, the synchronized video media being locally accessible by each of the plurality of computing devices, the system comprising:

one or more processing units;

memory;

a content distribution module, stored in the memory and executable on the one or more processing units, to distribute user generated data, the user generated data comprising text for display within a chat bubble that is integrated with a translucent or substantially translucent graphic layer that is merged with the synchronized video media, wherein the translucent or substantially translucent graphic layer merged with the synchronized video media creates combined video media that includes both the translucent or substantially translucent graphic layer and the synchronized video media for presentation on each of the plurality of computing devices for a period of time, wherein the period of time is based at least in part on a number of words of the text within the chat bubble; and a synchronization module, stored in the memory and executable on the one or more processing units, to periodically resynchronize playback of the video media among the plurality of computing devices.

18. A method, comprising:

verifying that a specified video media is locally accessible by at least two computing devices;

synchronizing playback of the specified video media locally accessible by the at least two computing devices; and delivering content comprising text received from one of the at least two computing devices to another of the at least two computing devices, the content being presented as text within a chat bubble for a period of time in a translucent or substantially translucent graphic layer superimposed over the specified video media playing on the another of the at least two computing devices, wherein the period of time during which the text within the chat bubble is presented in the translucent or substantially translucent graphic layer over the specified video media is based at least in part on a number of words of the text within the chat bubble, and wherein the chat bubble is spatially positioned in the translucent or substantially translucent graphic layer to avoid interfering with an object or a person appearing in the specified video media.

* * * * *